(12) United States Patent
Erestam

(10) Patent No.: US 11,200,774 B2
(45) Date of Patent: Dec. 14, 2021

(54) DEVICE FOR REAL TIME EQUIPMENT TRACKING AT A CONSTRUCTION SITE

(71) Applicant: HUSQVARNA AB, Huskvarna (SE)

(72) Inventor: Anders Erestam, Gothenburg (SE)

(73) Assignee: Husqvarna AB, Huskvarna (SE)

( * ) Notice: Subject to any disclaimer, the term of this patent is extended or adjusted under 35 U.S.C. 154(b) by 247 days.

(21) Appl. No.: 16/086,419

(22) PCT Filed: Mar. 13, 2017

(86) PCT No.: PCT/SE2017/050238
§ 371 (c)(1),
(2) Date: Sep. 19, 2018

(87) PCT Pub. No.: WO2017/164794
PCT Pub. Date: Sep. 28, 2017

(65) Prior Publication Data
US 2019/0088069 A1    Mar. 21, 2019

(30) Foreign Application Priority Data

Mar. 21, 2016   (SE) .................................. 1650373-2

(51) Int. Cl.
| | |
|---|---|
| *G06Q 30/06* | (2012.01) |
| *G07F 17/00* | (2006.01) |
| *G06Q 50/08* | (2012.01) |
| *G06Q 50/28* | (2012.01) |
| *G06Q 10/06* | (2012.01) |

(Continued)

(52) U.S. Cl.
CPC ........... *G07F 17/0057* (2013.01); *G05B 9/00* (2013.01); *G06Q 10/02* (2013.01); *G06Q 10/06* (2013.01); *G06Q 10/0633* (2013.01); *G06Q 10/08* (2013.01); *G06Q 30/0645* (2013.01);

(Continued)

(58) Field of Classification Search
None
See application file for complete search history.

(56) References Cited

U.S. PATENT DOCUMENTS 9,145,067 B1 *  9/2015  Dahlen .................... G01S 1/00
9,467,862 B2 * 10/2016  Zeiler ................. H04W 12/126

(Continued)

FOREIGN PATENT DOCUMENTS

| CN | 1841437 A * | 10/2006 | .......... B23K 9/1062 |
| DE | 102015226796 A1 * | 12/2016 | ................ B25F 5/00 |

OTHER PUBLICATIONS

Schneider, "Radio Frequency Identification (RFID) Technology and its Applications in the Commercial Construction Industry", University of Kentucky Civil Engineering Department, Apr. 24, 2003 (Year: 2003).*

(Continued)

*Primary Examiner* — Paul R Fisher
(74) *Attorney, Agent, or Firm* — Burr & Forman, LLP

(57) ABSTRACT

A construction site status monitoring device is provided including processing circuitry configured to receive sensor data from a sensor associated with one or more construction devices, receive location data associated with the one or more construction devices, and generate a construction site status report based on the sensor data and the location data, wherein the construction site status report is indicative of conditions and location of the one or more construction devices.

20 Claims, 5 Drawing Sheets

(51) Int. Cl.
*G07C 3/00* (2006.01)
*G06Q 10/08* (2012.01)
*G05B 9/00* (2006.01)
*G06Q 10/02* (2012.01)
*G07C 3/12* (2006.01)

(52) U.S. Cl.
CPC ............. *G06Q 50/08* (2013.01); *G06Q 50/28* (2013.01); *G07C 3/00* (2013.01); *G07C 3/12* (2013.01)

(56) References Cited

U.S. PATENT DOCUMENTS

| | | | | |
|---|---|---|---|---|
| 10,437,228 B2* | 10/2019 | Kreuzer | ................... | G07C 9/38 |
| 2002/0177926 A1* | 11/2002 | Lockwood | ............. | G06Q 10/20 |
| | | | | 701/1 |
| 2006/0197483 A1* | 9/2006 | Garcia | ............... | B23Q 11/0092 |
| | | | | 318/480 |
| 2009/0015372 A1* | 1/2009 | Kady | ........................ | G06F 1/26 |
| | | | | 340/5.54 |
| 2009/0021367 A1* | 1/2009 | Davies | ................. | A01K 29/005 |
| | | | | 340/539.1 |
| 2010/0324955 A1* | 12/2010 | Rinehart | ............ | G06Q 10/0637 |
| | | | | 705/7.36 |
| 2013/0109375 A1* | 5/2013 | Zeiler | ............... | H04W 12/1206 |
| | | | | 455/426.1 |
| 2015/0097674 A1 | 4/2015 | Mondal et al. | | |

OTHER PUBLICATIONS

Xuesong et al., "Wireless Sensor Networks for Resources Tracking at Building Construction Sites", Tsinghua Science and Technology, pp. 78-83, vol. 13, No. S1, Oct. 2008 (Year: 2008).*
Notice and International Type Search Report for Swedish Application No. 1650373-2 dated Nov. 9, 2016.
International Search Report and Written Opinion for International Application No. PCT/SE2017/050238 dated May 23, 2017.
International Preliminary Report on Patentability for International Application No. PCT/SE2017/050238 dated Sep. 25, 2018.

* cited by examiner

DEVICE FOR REAL TIME EQUIPMENT TRACKING AT A CONSTRUCTION SITE

TECHNICAL FIELD

Example embodiments generally relate to construction equipment and, more particularly, relate to real time equipment tracking at a construction site.

BACKGROUND

Construction equipment includes such devices as saws, drills, generators, nail guns, demolition robots, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, driving nails or rivets, or the like. Thus, these devices have the capability to be sources of risk for damage to equipment.

Tracking of construction devices at a construction site may be a particularly difficult task due to the number and variety of construction devices. Additionally, numerous operators may be operating and moving the construction devices on a continuous basis. Some methods of managing construction devices on a construction site include tool check out and check in procedures, in which a construction device is checked out to an operator for use and then returned by the operator. Ideally, only the operator checking out the construction device would use the device and only check out one device at a time. However the dynamics of a construction site often lead to workers sharing devices, runners checking out the construction devices, and checking out of multiple tools. The tracking of construction devices may be further complicated when construction devices are not checked in or if the construction device is removed from the construction site, such as theft.

BRIEF SUMMARY OF SOME EXAMPLES

In an example embodiment, a construction site status monitoring device is provided including processing circuitry configured to receive sensor data from a sensor associated with one or more construction devices, receive location data associated with the one or more construction devices, and generate a construction site status report based on the sensor data and the location data, wherein the construction site status report is indicative of conditions and location of the one or more construction devices.

In another example embodiment, a construction site status monitoring system is provided including a plurality of construction devices, each comprising a working element and a sensor and a construction site status monitoring device. The construction site status monitoring device including processing circuitry configured to receive sensor data from the sensor associated with one or more of the plurality of construction devices, receive location data associated with the one or more of the plurality of construction devices, and generate a construction site status report based on the sensor data and the location data, wherein the construction site status report is indicative of conditions and location of the one or more construction devices.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
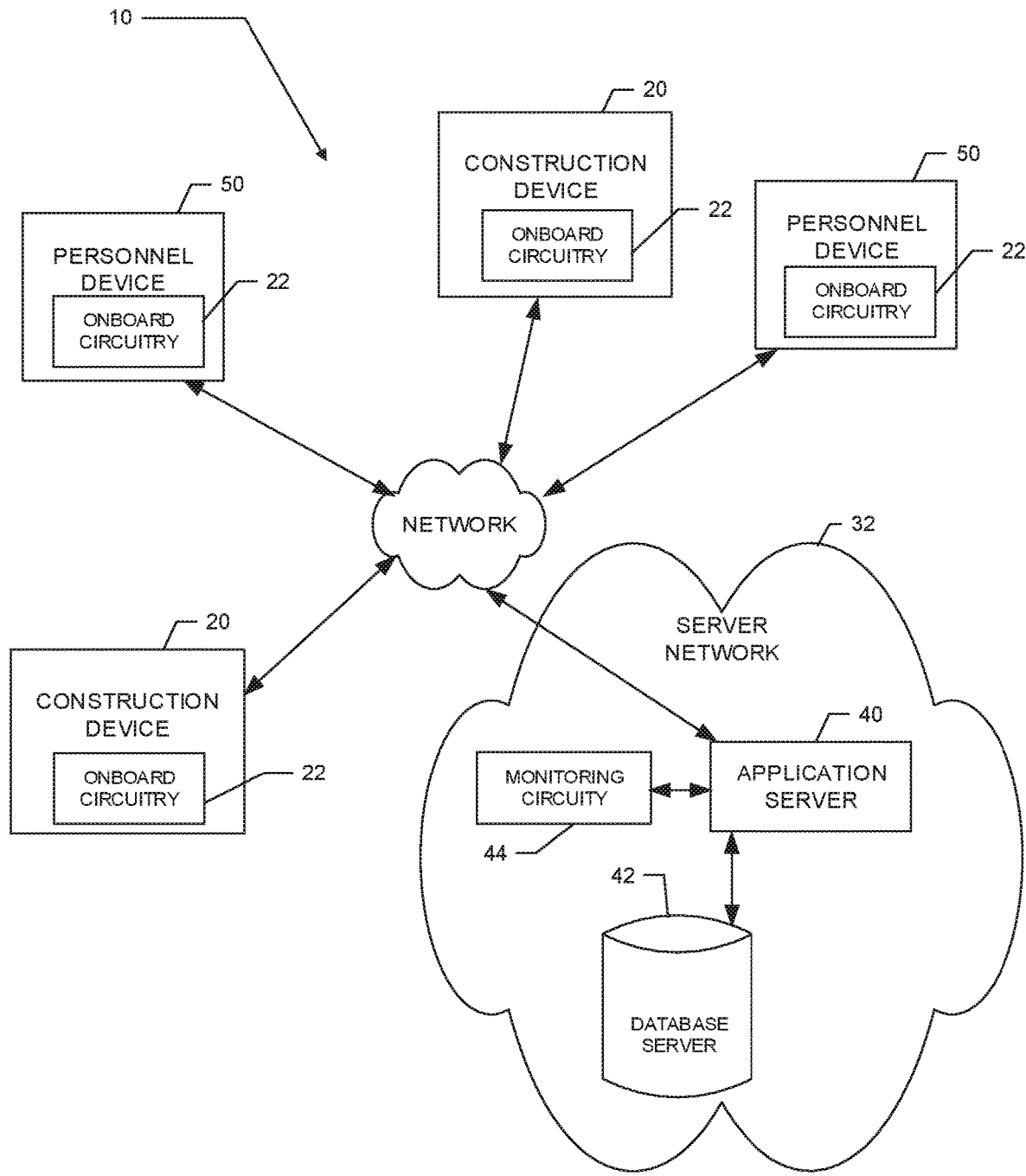
FIG. 1 illustrates a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction site status monitoring device that may be employed on any of a number of different pieces of construction devices or personal devices. The construction site status monitoring device may employ sensors, such as on a construction device to monitor the locations and conditions of the construction devices in the construction area. The construction site status monitoring device may generate a construction site status report based on the sensor data collected from the construction devices and/or the location data associated with operators or their personnel devices. The construction site status report may allow for real time or near real time tracking of locations and conditions of construction devices and personnel locations.

In an example embodiment, the construction site status monitoring device may receive worker assignments associated with one or more construction device, or use location or proximity data associated with the construction devices and or personnel devices to determine operator use and/or possession of construction devices.

In some example embodiments, conditions of the construction devices may be included in the construction site status report, such as maintenance, malfunctions, run hours, operating parameters, or the like. In an example embodiment, warning indications, or construction device shutdowns may be generated by the construction site status monitoring device based on the construction site status report, such as the conditions of the construction devices.

In an example embodiment, the location of the construction device in the construction site status report may be indicative of a construction device leaving the construction site. The construction site status monitoring device may cause a loss prevention alert to prevent the item from being stolen or alert a user to the removal of the construction device.

In some example embodiments, the construction site status monitoring device may receive rental rate data associated with one or more construction devices and generate a rental rate adjustment based on the construction site status report. In some embodiments, rental rates may be adjusted based on exceeding a run hour allotment, keeping the construction device for longer than a term period, mishandling of the construction device, or the like. The construction site status monitoring device may also generate and/or cause the transmission of a rental invoice to be transmitted based on the rental data and/or the rental rate adjustment.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g., construction devices 20 and personnel devices 50). Notably, although FIG. 1 illustrates four devices 20, 50 it should be appreciated that many more devices 20, 50 may be included in some embodiments and thus, the four devices 20, 50 of FIG. 1 are simply used to illustrate a multiplicity of devices 20, 50 and the number of devices 20, 50 is in no way limiting to other example embodiments. In this regard, example embodiments are scalable to inclusion of any number of devices 20, 50 being tied into the system 10. Moreover, it should be appreciated that FIG. 1 illustrates one example embodiment in which shared resources may be allocated within a community of networked devices (e.g., devices 20, 50). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50 that are associated with corresponding specific servers that belong to or are utilized by a particular organization, entity or group over a single network (e.g., network 30). However, in other embodiments, multiple different sets of devices 20, 50 may be enabled to access other servers associated with different organizations, entities or groups via the same or a different network.

The devices 20, 50 may, in some cases, each include sensory, computing and/or communication devices associated with different devices 20, 50 that belong to or are associated with a single organization, for example fleet management of devices 20, 50 at a construction site. In another example, a first device 20, 50 may be associated with a first facility or location of a first organization. Meanwhile, a second device may be associated with a second facility or location of the first organization. As such, for example, some of the devices 20, 50 may be associated with the first organization, while other ones of the devices 20, 50 are associated with a second organization. Thus, for example, the devices 20, 50 may be remotely located from each other, collocated, or combinations thereof. However, in some embodiments, each of the devices 20, 50 may be associated with individuals, locations or entities associated with different organizations or merely representing individual devices.

Each one of the construction devices 20 may include a housing inside which a power unit or motor (not shown) is housed. In some embodiments, the power unit may be an electric motor, an internal combustion engine, hydraulic system, pneumatic system, combustion chamber, or the like. The construction devices 20 may each further include a working element. The working element may be operated via the power unit to perform construction operations, such as drilling, cutting, demolishing, nailing, or the like. Various example types of construction devices 20 with which example embodiments may be associated should be understood to have corresponding different types of working elements (e.g., blades, cutting chain, drill bits, nailers, or the like). The construction devices 20 may include sensors for monitoring location, device operation, orientation, or the like, as discussed below in reference to FIG. 2.

Figure 2:
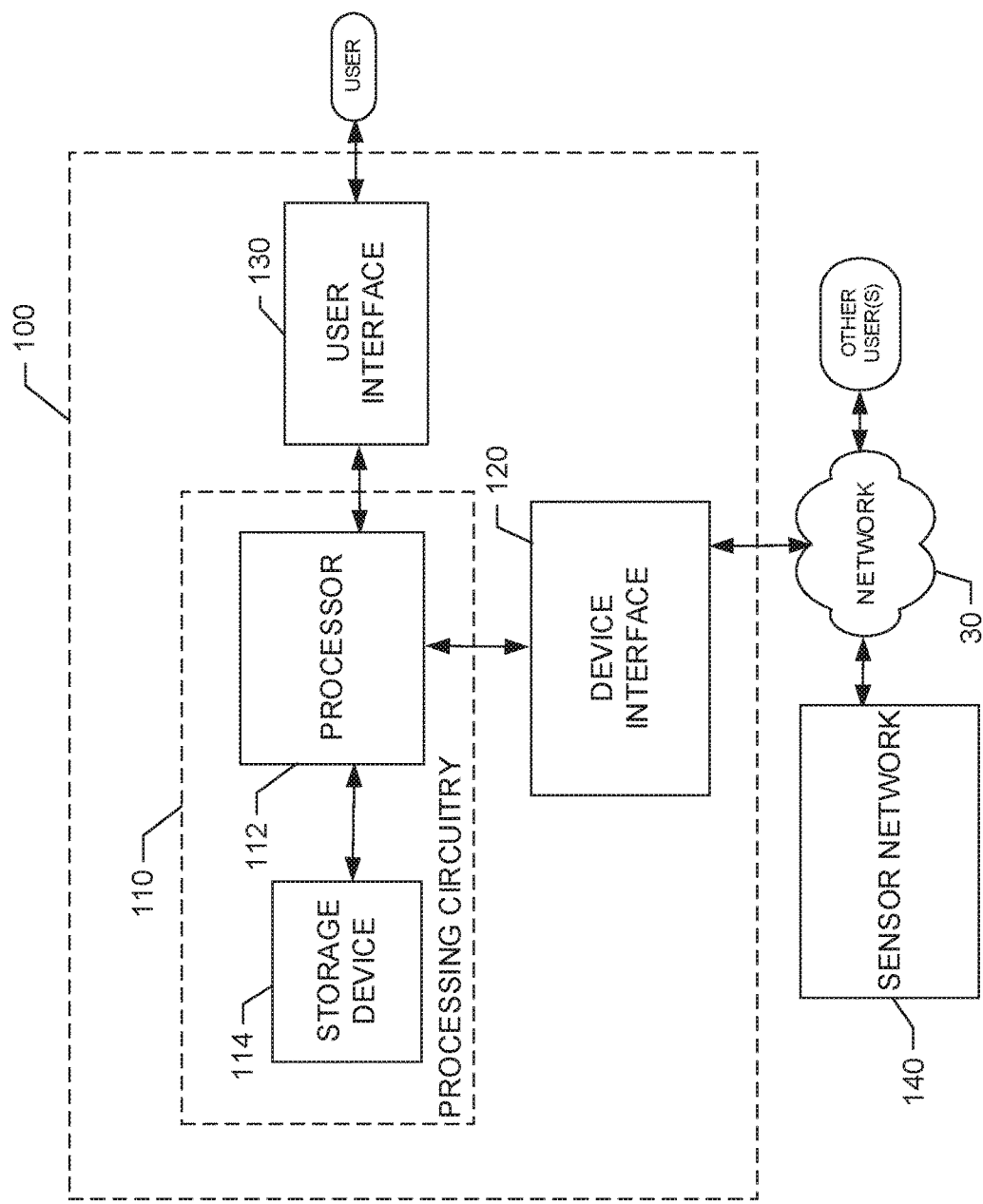
FIG. 2 illustrates a block diagram of one example of onboard electronics or monitoring circuitry that may be used in connection with employment of an example embodiment.

Each of the personnel devices 50 may include location sensors and/or a user interface, as discussed below in reference to FIG. 2. The location sensors may be useful in monitoring a location associated with workers. The user interface may be useful for receiving user input and/or displaying construction site status information.

In an example embodiment, each of the devices 20, 50 may include onboard circuitry 22 which may include or otherwise be embodied as a computing device (e.g., a processor, microcontroller, processing circuitry, or the like) capable of communication with a network 30. As such, for example, each one of the devices 20, 50 may include (or otherwise have access to) memory for storing instructions or applications for the performance of various functions and a corresponding processor for executing stored instructions or applications and a corresponding processor or processing circuitry. Each one of the devices 20, 50 may also include software and/or corresponding hardware (e.g., the onboard circuitry 22) for enabling the performance of the respective functions of the clients as described below. In an example embodiment, one or more of the devices 20, 50 may be configured to execute applications or functions implemented via software for enabling a respective one of the devices 20, 50 to communicate with the network 30 for requesting and/or receiving information and/or services via the network 30 and/or for providing data to other devices via the network 30. The information or services receivable at the devices 20, 50 may include deliverable components (e.g., downloadable software to configure the onboard circuitry 22 of the devices 20, 50, or information for consumption or utilization at the onboard circuitry 22 of the devices 20, 50).

The network 30 may be a data network, such as a local area network (LAN), a metropolitan area network (MAN), a wide area network (WAN) (e.g., the Internet), and/or the like, which may couple the devices 20, 50 to devices such as processing elements (e.g., personal computers, server computers or the like) and/or databases. Communication between the network 30, the devices 20, 50 and the devices or databases (e.g., servers) to which the devices 20, 50 are coupled may be accomplished by either wired or wireless communication mechanisms and corresponding communication protocols.

In an example embodiment, other devices to which the devices 20, 50 may be coupled via the network 30 may include a server network 32 including one or more application servers (e.g., application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g., via the monitoring circuitry 44) may be the provision of services relating to generation of a construction site status report, as will be described in greater detail below. For example, the application server 40 may be local or remote and be configured to receive data from the devices 20, 50 and process the data to coordinate construction site operations, as described herein. Thus, for example, the onboard circuitry 22 may be configured to send the data to the application server 40 for the application server to coordinate construction site operations (e.g., monitor and/or deploy personnel and/or device 20, 50 to locations throughout the construction site), or have actions associated therewith (e.g., send information, alerts, or safety interlocks to devices 20, 50). In some embodiments, the application server 40 may be configured to provide devices 20, 50 with instructions (e.g., for execution by the onboard circuitry 22) for taking prescribed actions when corresponding construction site status report attributes are identified.

Accordingly, in some example embodiments, data from devices 20, 50 may be provided to and analyzed at the application server 40 to identify or define a construction site status (CSS) (e.g., in real time or at a later time). The CSS may be associated with actions to be taken by the corresponding one of the devices 20, 50 that sent the data (or another device within the construction site) in response to a future detection of the CSS. The application server 40 may then equip one or more of the devices 20, 50 to detect the defined CSS in the future, and also provide instructions for actions to be taken when the defined CSS is encountered. Each one of the devices 20, 50 that has received the instructions may then detect the defined CSS and take the appropriate action. In one example embodiment, the CSS may include generation of a construction site status report based on construction device 20 sensor data and personnel device 50 location data, indicative of the location and conditions of the construction device and locations of personnel associated with the personnel device.

Alternatively or additionally, data from devices 20, 50 may be provided to and analyzed at the application server 40 (e.g., in real time) to identify or define a CSS. The CSS may be associated with actions to be taken by the application server 40 in response to a future detection of the CSS. The application server 40 may then provide a report or warning or may direct action to be taken at one or more devices 20, 50 when an occurrence of the defined CSS is detected in the future.

In still other embodiments, the devices 20, 50 themselves may analyze data for detection of CSSs (e.g., using the onboard circuitry 22) and define and/or take action responsive to detecting the occurrence of a defined CSS. Thus, the devices 20, 50 may operate in some cases independently of the network 30 and the application server 40. However, in some cases, the application server 40 may be used to provide defined CSSs to the devices 20, 50 and the devices 20, 50 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a CSS monitoring device 100. The CSS monitoring device may be embodied in a construction device 20, a personnel device 50, a separate computing device, or be distributed among the devices 20, 50, and/or a separate computing device. The CSS monitoring device 100 may include processing circuitry 110 of an example embodiment as described herein. In this regard, for example, the CSS monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g., operational parameters and/or location information) relating to a corresponding one of the devices 20, 50. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer on a device being monitored (e.g., one of the devices 20, 50), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g., function buttons), and/or other input/output mechanisms. In an example embodiment, the user interface 130 may include one or a plurality of lights, a display, a speaker, a tone generator, a vibration unit and/or the like. In an example embodiment, the user interface may be remote, such as a display of a personnel device 50.

The device interface 120 may include one or more interface mechanisms for enabling communication with other devices (e.g., sensors of the sensor network 140, or functional units of the CSS monitoring device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CSS monitoring device 100. In some cases, the device interface 120 may further include wireless communication equipment (e.g., a one way or two way radio) for at least communicating information from the CSS monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CSS monitoring device 100 based on inputs received by the processing circuitry 110. As such, in some embodiments, the processor 112 (or the processing circuitry 110) may be said to cause each of the operations described in connection with the CSS monitoring device 100 in relation to operation of the CSS monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CSS monitoring device 100, or any other functional units that may be associated with the CSS monitoring device 100. Among the contents of the memory 114, applications may be stored for execution by the processor 112 in order to carry out the functionality associated with each respective application. In some cases, the applications may include instructions for recognition of patterns of activity and for initiation of one or more responses to the recognition of any particular pattern of activity as described herein. Additionally or alternatively, the applications may prescribe particular reporting paradigms or protocols for reporting of information from the outdoor power tool activity monitoring device 100 to a network device using the device interface 120.

In some embodiments, the processing circuitry 110 may communicate with electronic components and/or sensors of a sensor network 140 (e.g., sensors that measure variable values related to device operational parameters like RPM, temperature, oil pressure, diagnostics, voltage, current, impact, maintenance, and/or the like, and/or sensors that measure device movement employing movement sensor circuitry) of the construction device 20 via the device interface 120. In one embodiment, sensors of the sensor network 140 of one or more ones of the devices 20, 50 may communicate with the processing circuitry 110 of a remote monitoring computer via the network 30 and the device interface 120 using wireless communication or by downloading data that is transferred using a removable memory device that is first in communication with the device 20 to load data indicative of device activity, and is then (e.g., via the device interface 120) in communication with the remote monitoring computer (e.g., associated with the monitoring circuitry 44).

In some embodiments, the processing circuitry 110 may communicate with movement sensor circuitry of the devices 20, 50 (e.g., when the processing circuitry 110 is implemented as the onboard circuitry 22), or may receive information indicative of device location from movement sensor circuitry of one or more devices being monitored (e.g., when the processing circuitry is implemented as the monitoring circuitry 44). The movement sensor circuitry may include movement sensors (e.g., portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50 based on data provided by the one or more accelerometers and/or gyroscopes, and/or based on GPS or local location determining capabilities. In other words, the movement sensor circuitry may be configured to detect movement of the device 20, 50 based on inertia-related measurements or other location determining information. In some example embodiments, the movement sensor circuitry may include orientation sensors, configured to detect the orientation of a device, particularly the working element of the device relative the determined location.

Figure 3:
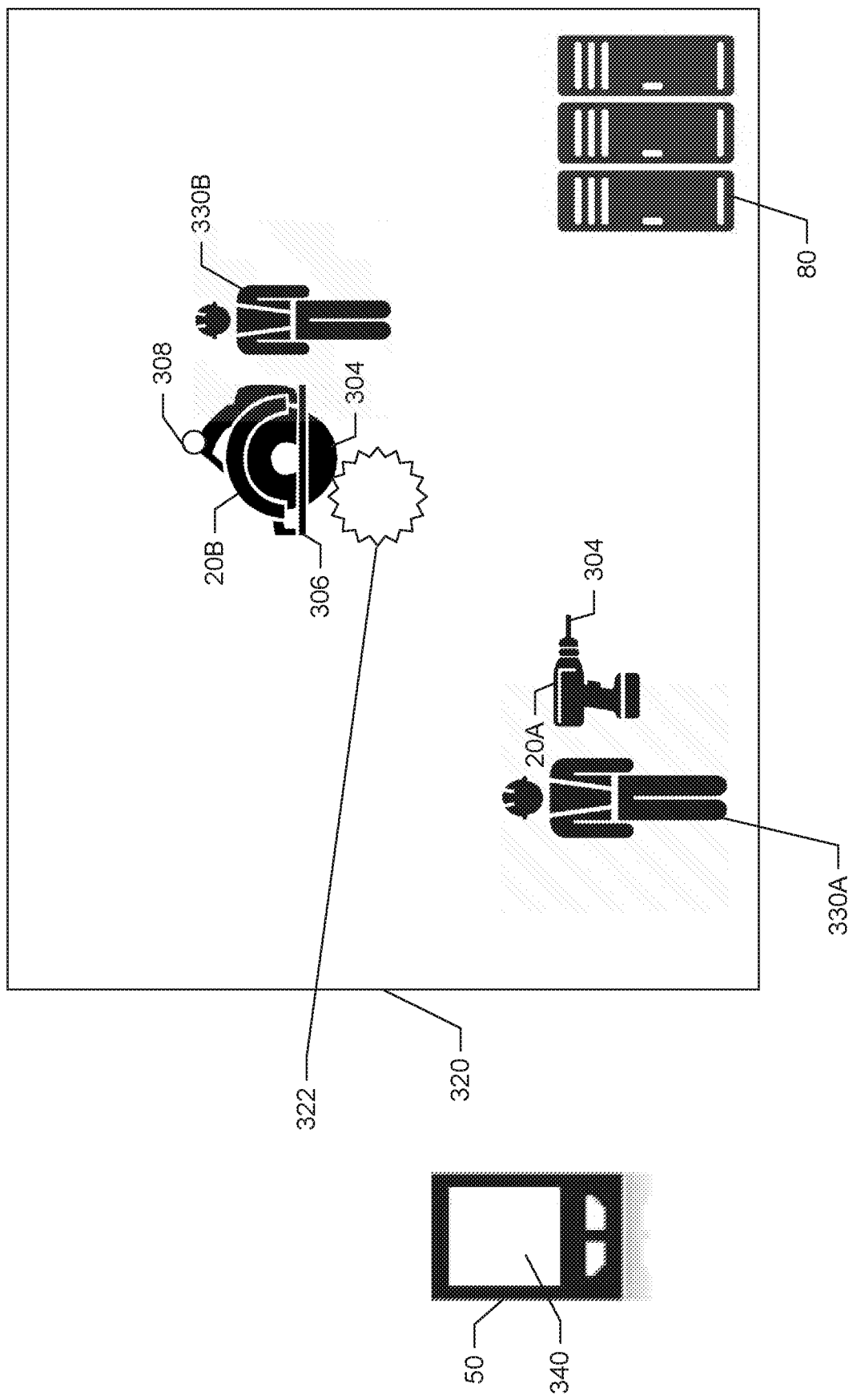
FIG. 3 illustrates an example construction site according to an example embodiment.

FIG. 3 illustrates an example construction site according to an example embodiment. The construction site 320 may include one or more construction devices 20, such as saws, nailers, jackhammers, drills, or the like. The construction device 20 may include a working element 304, such as a blade, nail driver, drill bit, or the like, configured to perform work such as cutting, nailing, drilling, or the like, on a working material 322. The working material 322 may be wood, drywall, plaster board, concrete, brick, stone or other materials. A CSS monitoring device 100 may generate a construction site status report, as discussed below.

The CSS monitoring device 100 may receive sensor data from one or more sensors 306, such as a portion of the sensor network 140, associated with one or more construction devices 20. The sensors 306 may include locations sensors, such as GPS, proximity sensors, such as radio frequency identification (RFID), current sensors, voltage sensors, temperature sensors, accelerometers, diagnostic sensors, maintenance sensors, or the like. The sensor data may be indicative of the location, orientation, and/or conditions of the construction device 20.

The CSS monitoring device may also receive location data from one or more personnel devices 50. In an example embodiment, the personnel devices 50 may include personal digital assistance, smart phone, tablet computers, wearable computers, or the like. In some example embodiments, the personnel devices 50 may include location tags, such as associated with safety equipment (e.g. helmets, vests, harnesses, or the like). The location tags may utilize GPS location data, RFID location data, cellular location data, Wi-Fi location data, or the like.

In an example embodiment, the CSS monitoring device 100 may receive construction device worker assignments. Construction devices 20 may be associated with a specific worker or group of workers. The construction device worker assignments may include a construction device identifier, such as a serial number, a location data identifier, or the like. The construction device identifier may be manually entered, scanned, such a bar code or QR code, or the like, using a user interface 130. The construction device worker assignments may also include a worker identifier, such as a worker ID number, location data identifier from a personnel device 50 associated with the worker, or the like. The worker identifier may be manually entered, scanned, such a bar code or QR code, or the like, using the user interface 130. In an example embodiment, the construction device 20 and worker may be automatically associated based on proximity of their associated location data. For example, the construction device may associate worker 330A with construction device 20A and worker 330B with construction device 20B, due to the relative locations to each other, for example less than or equal to 3 ft from each other.

Figure 4:
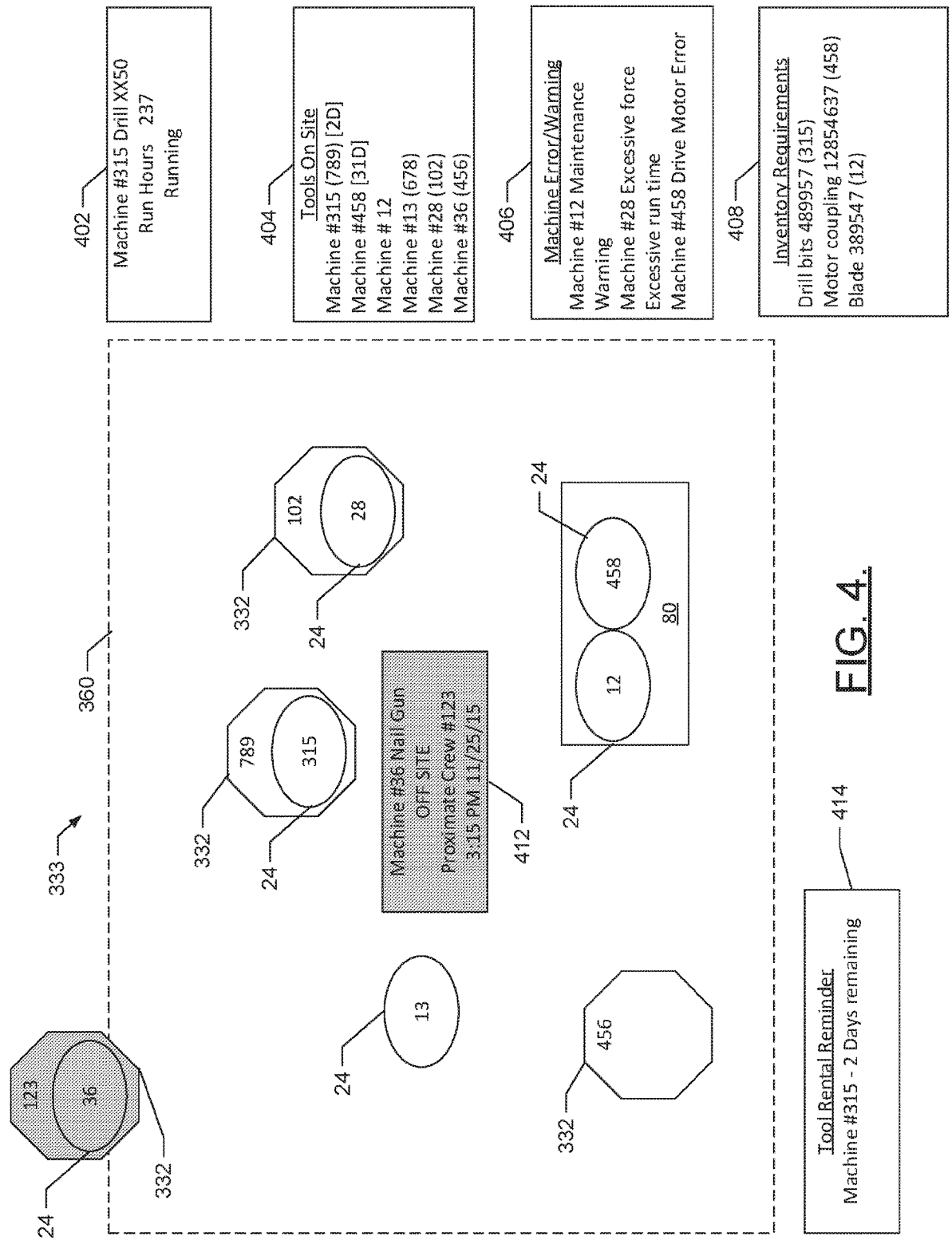
FIG. 4 illustrates a construction site status report according to an example embodiment.

In an example embodiment, the CSS monitoring device 100 may generate a construction site status report 333 based on the sensor data, location data, construction device worker assignments, or the like. An example construction site status report 333 is illustrated in FIG. 4. The CSS monitoring device 100 may cause the construction site status report 333 to be displayed on the user interface 130, such as the display 340 of the personnel device 50, or a graphic user interface (GUI) associated with the CSS monitoring device; and/or stored in a memory 114, 42. The construction site status report 333 may include a visual representation 360 of the construction site 320 including a construction site perimeter 360, construction device locations 24, worker locations 332, and storage locations 80. In some embodiments, the worker locations 332 may be based on the location data associated with a personnel device 50. The worker locations 332 and construction device locations 24 may be indicated by color, shapes, identification numbers, or the like. In the depicted example, the construction device locations 24 are indicted by an oval including a construction device identification number and the workers locations 332 are indicated by an octagon including a worker identification number.

In some example embodiments, the worker location 332 may be associated with a construction device location 24, such as based on proximity of the worker location 332 and the construction device location 24. In some embodiments, the association of the construction device location 24 and the worker location 332, may be indicated by a common color, shape, or the like. In the depicted example, the construction device locations are indicated within the worker locations 322.

In an example embodiment, the construction site status report 333 may include construction device conditions 402. The construction device conditions 402 may be displayed for selected construction devices 20, for construction device groups, or all construction devices 20. The construction device conditions 402 may include a construction device identifier, model number, run hours, status (e.g. running, idle, on site, storage, off site, maintenance required, malfunctions, or the like).

In some example embodiments, the construction site status report 333 may include a construction site inventory 404. The construction site inventory 404 may include each of the construction devices 20 within the construction site perimeter 360. In an example embodiment, the construction site inventory 404 may include construction site worker associations, for example the worker 330 which checked out the construction device 20.

In an instance in which one or more construction devices are rented, the CSS monitoring device may receive rental data, such as rental rate, construction device use conditions, and/or rental period. The construction site inventory 404 may include the remaining time of the rental period, such as 2 days (2D) or 31 days (31D). Additionally or alternatively, the construction site status report 333 may include a tool rental reminder 414 including the remaining period for construction devices which are nearing the end of the rental period.

In an example embodiment, the construction site status report 333 may include maintenance errors or warnings 406 associated with the construction devices. The maintenance errors or warnings 406 may be based on the sensor data from the respective construction devices 20. The maintenance error and warnings 406 may include periodic maintenance, based on run hours or construction device conditions, such as changing oil, replacing blades, or the like. The maintenance error and warnings 406 may also include condition warnings associated with the construction devices, such as excessive use, e.g. run hours, in a predetermined period, construction device diagnostic errors, such as performed by onboard circuitry 22, and warning indicative or misuse, such as dropping excessive force, high temperature, or the like. In some embodiments, maintenance error and warnings may be based on orientation, construction device proximities, or the like.

In some example embodiments, the CSS monitoring device 100 may cause a warning to be indicated on an indicator 308 on the user device 20, such as a warning light or a plurality of warning lights. In an example embodiment, the warning indication may be displayed on the user interface 130, such as the display 340 of the personnel device 50 or associated with the construction device 20.

In an example embodiment, the CSS monitoring device 100 may cause a construction device 20 to shutdown based on a predetermined construction device condition, such as mechanical errors and malfunctions, runtimes, misuse or the like, in the construction site status report 333. The shutdown the construction device 20 may prevent or limit damage to the construction device 20. Additionally or alternatively, a user may remotely shutdown a construction device 20 based on the construction site status monitoring report 333 or other information, such as a fire, injury, or other emergency.

In an example embodiment, the CSS monitoring device 100 may correlate operations performed by the construction devices 20 to a site plan. The site plan may be receive from a local memory, such as storage device 114, or a remote memory, such as database server 42. The site plan may include the desired working materials and construction device 20 operations. The CSS monitoring device 100 may determine the operations performed by the construction device, such as cutting, fastening, drilling, or the like, based on the sensor data. The CSS monitoring device may compare the location of the desired operations to operation locations indicated by the sensor data to correlate operations. The correlation of construction site operations to the site plan may be useful for tracking construction site activity. In an example embodiment, the CSS monitoring device 100 may also update the site plan for any deviations between the desired operation location and the operation locations indicated by the sensor data.

In some example embodiments, the CSS monitoring device 100 may generate a site inventory order 408 based on the construction site status report 333. The CSS monitoring device 100 may generate the site inventory order 408 based on construction device 20 maintenance and errors 406, such as repair or maintenance parts for servicing or repairing the construction devices. The site inventory order 408 may include the construction device associated with the order item, the item identifier, or the like. The site inventory order 408 may be modified by a user, such as removing items which are on site, or adding items to ensure the item will be on site for subsequent service and repairs. In an example embodiment, the site inventory order 408 may be transmitted to a vendor, comptroller, or the like for procurement of the items. The site inventory order 408 may be transmitted automatically, such as at a predetermined interval, or by manual initiation.

In some example embodiments, the CSS monitoring device 100 may cause a loss prevention alert 412 based on the construction site status report 333, such as in an instance an which the construction device location 24 breaches the construction site perimeter 360. Referring to the example depicted in FIG. 4, the construction device location 24 associated with a construction device identifier 36, has breached the construction site perimeter 360. In an example embodiment, the construction site status report 333 may include a display of the loss prevention alert 412 with the construction site status report 333, such as over laid on top of the construction site status report 333. In some example embodiments, the loss prevention alert 412 may include a construction device identifier, any proximate worker identifiers, the time of the breach, or the like. In an example embodiment, the construction device location 24 and/or proximate worker locations 332, such as worker 123, may be depicted to provide contrast in the construction site status report 333, such as by using a different color to display the various items. Additionally or alternatively, the loss prevention alert 412 may be audio or visual alarms on the construction site 320, such as near a gate, or area proximate to the breach of the construction site perimeter 360.

In instances in which the CSS monitoring device 100 receives rental data, the CSS monitoring device 100 may generate a rental rate adjustment based on the construction site status report 333. For example, the rental rate may be adjusted upwardly in instances in which the construction device 20 is maintained at the construction site 320 past the rental period, in instances in which the construction device sensor data indicates misuse, or the like. Similarly, the rental rate may be adjusted downwardly in instances in which the construction device 20 is out of service for maintenance or repair during the rental period, or the construction device conditions indicate nominal or efficient use during the rental period.

In some embodiments the CSS monitoring device 100 may generate a rental invoice based on the rental rate data and the rental rate adjustment. The rental rate adjustment may be applied to the rental rate data and rental price determined based on the adjusted rental rate and the rental period. In an example embodiment, the CSS monitoring device 100 may also transmit the rental invoice to the rental company and/or a comptroller for records and payment.

Figure 5:
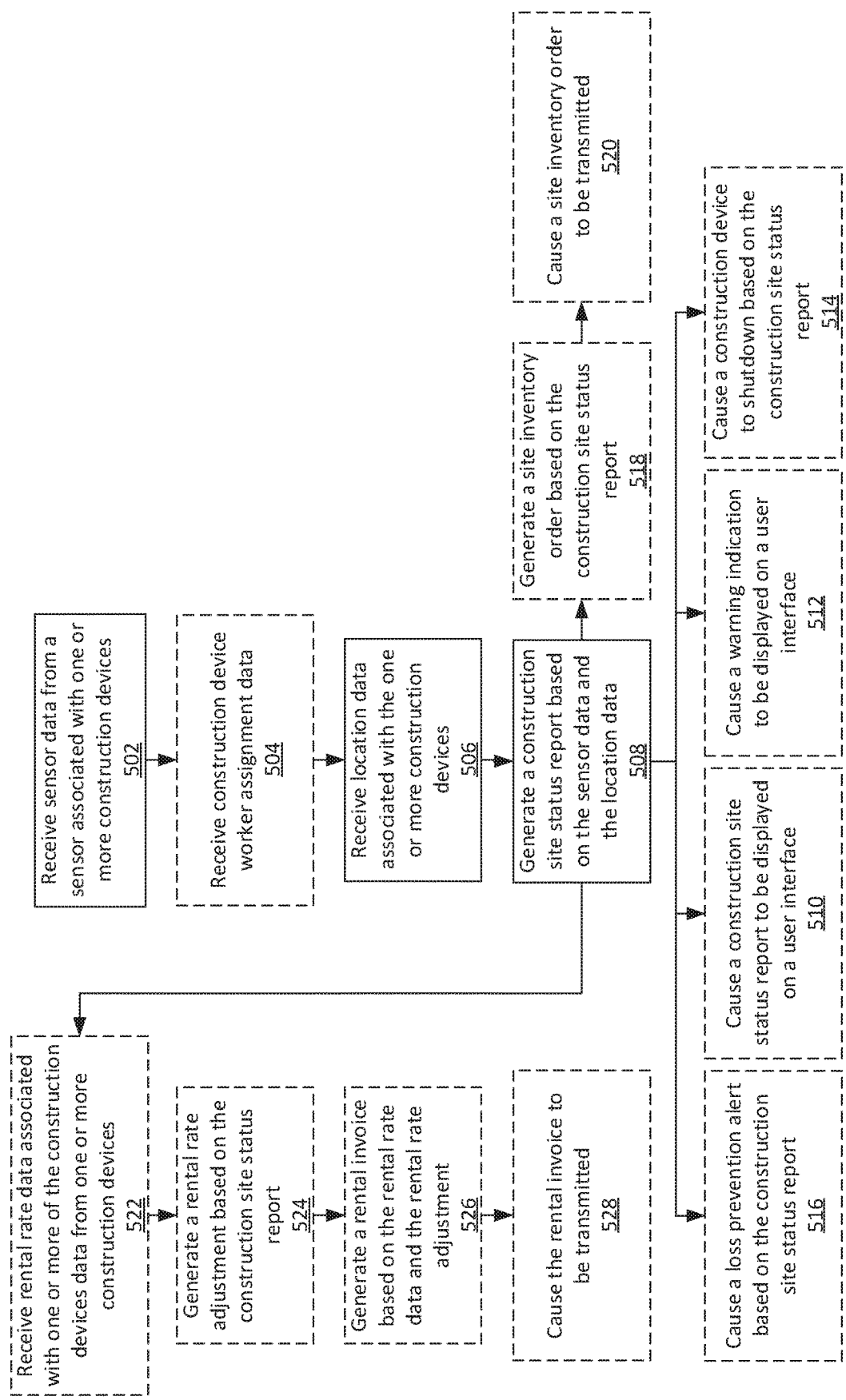
FIG. 5 illustrates a method of utilizing construction site status monitoring device in relation to operation of a construction device according to an example embodiment.

In some cases, a method of utilizing CSS analysis in relation to operation of the CSS monitoring device 100 and/or one or more construction devices 20 according to an example embodiment may be provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CSS monitoring device 100 and/or the one or more construction tools according to the method.

In an example embodiment, the method may include receiving sensor data from a sensor associated with one or more construction devices at operation 502, receiving location data from one or more personnel devices 506, and generating a construction site status report based on the sensor data and location data at operation 508.

In some embodiments, the method may include additional, optional operations, and/or the operations described above may be modified or augmented. Some examples of modifications, optional operations, and augmentations are described below, as indicated by dashed lines. In an example embodiment, the method also includes receiving construction device-worker assignment data at operation 504, causing a construction site status report to be displayed on a user interface at operation 510, and causing a warning indication to be displayed on a user interface at operation 512. In some example embodiments, the method also includes causing a construction device to shutdown based on the construction site status report at operation 514 and causing a loss prevention alert based on the construction site status report at operation 516. In an example embodiment, the method also includes generating a site inventory order based on the construction site status report at operation 518 and causing a site inventory order to be transmitted at operation 520. In some example embodiments, the method also includes receiving rental rate data associated with one or more of the construction devices data from one or more construction devices at operation 522, and generating a rental rate adjustment based on the construction site status report at operation 524, generating a rental invoice based on the rental rate data and the rental rate adjustment at operation 526, and causing the rental invoice to be transmitted at operation 528.

In an example embodiment, the CSS monitoring device 100 may comprise a processor (e.g., the processor 112) or processing circuitry 110 configured to perform some or each of the operations (502-528) described above. The processor 112 may, for example, be configured to perform the operations (502-528) by performing hardware implemented logical functions, executing stored instructions, or executing algorithms for performing each of the operations. In some embodiments, the processor 112 or processing circuitry 110 may be further configured for additional operations or optional modifications to operations 502-528. In this regard, in an example embodiment, the processing circuitry is further configured to cause the construction site status report to be displayed on a user interface. In some example embodiments, the processing circuitry is further configured to cause a warning indication to be displayed on a user interface based on the construction site status report. In an example embodiment, the processing circuitry is further configured to cause a construction device to shutdown based on the construction site status report. In some example embodiments, the processing circuitry is further configured to generate a site inventory order based on the construction site status report. In an example embodiment, the construction site status report includes an indication usage of the one or more construction devices. In some example embodiments, the processing circuitry is further configured to cause a loss prevention alert based on the construction site status report. In an example embodiment, the processing circuitry is further configured to receive rental rate data associated with one or more of the construction devices and generate a rental rate adjustment based on the construction site status report. In some example embodiments, the processing circuitry is further configured to generate a rental invoice based on the rental rate data and the rental rate adjustment. In an example embodiment, the processing circuitry is further configured to receive construction device worker assignment data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A construction site status monitoring device comprising processing circuitry configured to:
    receive sensor data from a plurality of construction devices comprising a rented construction device and a non-rented construction device, the rented construction device and the non-rented construction device each being one of a saw, a nailer, or a drill, the senor data comprising operational information measured by respective operational sensors that are components of the construction devices and configured to detect at least an operating current and an operating voltage for a motor that powers a working element of each construction device as the operational information, the operational information being indicative of runtime data;
    receive location data from the plurality of construction devices, the location data comprising location information measured by respective location sensors that are components of the construction devices;
    receive rental data associated with the rented construction device, the rental data comprising a rental rate for the rented construction device for a run hour allotment; and
    generate a construction site status report based on the sensor data, the location data, and the rental data, wherein the construction site status report is indicative of conditions and locations of the plurality of construction devices, the construction site status report including runtimes of the plurality of construction devices based on the runtime data;
    cause a remote shutdown of the rented construction device based on the runtime for the rented construction device provided in the construction site status report; and
    determine that the runtime for the rented construction device exceeds the run hour allotment and, in response, adjust the rental rate for the rented construction device;
    wherein the operational information or the location information for both the rented construction device and the non-rented construction device is provided in a common data presentation in the construction site status report.

2. The construction site status monitoring device of claim 1, wherein the processing circuitry is further configured to:
    cause the construction site status report to be displayed on a user interface.

3. The construction site status monitoring device of claim 1, wherein the processing circuitry is further configured to:
    cause a warning indication to be displayed on a user interface based on the construction site status report.

4. The construction site status monitoring device of claim 1, wherein the processing circuitry is further configured to:
    cause a shutdown of the non-rented construction device based on the construction site status report.

5. The construction site status monitoring device of claim 1, wherein the processing circuitry is further configured to:
    generate a site inventory for the construction site status report indicating each of the plurality of construction devices that are within a construction site perimeter based on the location data;

wherein the site inventory includes a first indicator for the rented construction device and a second indicator for the non-rented construction device;

wherein the first indicator for the rented construction device is adjacent to a remaining rental period indicator for the rented construction device, the remaining rental period indicator providing a duration of rental time remaining for the rented construction device.

6. The construction site status monitoring device of claim 1, wherein the construction site status report includes an indication of usage of the rented construction device and the non-rented construction device.

7. The construction site status monitoring device of claim 1, wherein the processing circuitry is further configured to:
cause a loss prevention alert based on the construction site status report.

8. The construction site status monitoring device of claim 1, wherein the processing circuitry is further configured to:
generate a rental invoice based on the rental rate data and the adjustment of the rental rate.

9. The construction site status monitoring device of claim 8, wherein the processing circuitry is further configured to:
receive construction device worker assignment data that links a construction device identifier with a worker identifier based on the location data.

10. A construction site status monitoring system comprising:
a plurality of construction devices comprising a rented construction device and a non-rented construction device, the rented construction device and the non-rented construction device each being one of a saw, a nailer, or a drill,
wherein each construction device of the plurality of constructions devices comprises:
a working element configured to perform a construction work operation on a working material,
an operational sensor configured to measure operational information of the construction device for inclusion in sensor data, the operational sensor being configured to detect at least an operating current and an operating voltage for a motor that powers the working element as the operational data, the operational information being indicative of runtime data, and
a location sensor configured to measure location information of the construction device for inclusion in location data; and
a construction site status monitoring device comprising processing circuitry configured to:
receive the sensor data from the plurality of construction devices including the rented construction device and the non-rented construction device;
receive the location data from the plurality of construction devices including the rented construction device and the non-rented construction device;
receive rental data associated with the rented construction device included in the plurality of construction devices, the rental data comprising a rental rate for the rented construction device for a run hour allotment; and
generate a construction site status report based on the sensor data, the location data, and the rental data, wherein the construction site status report is indicative of conditions and locations of the plurality of construction devices, the construction site status report including runtimes of the plurality of construction devices based on the runtime data;
cause a remote shutdown of the rented construction device based on the runtime for the rented construction device provided in the construction site status report; and
determine that the runtime for the rented construction device exceeds the run hour allotment and, in response, adjust the rental rate for the rented construction device;
wherein the operational information or the location information for both the rented construction device and the non-rented construction device is provided in a common data presentation in the construction site status report.

11. The construction site status monitoring system of claim 10, wherein the processing circuitry is further configured to:
cause the construction site status report to be displayed on a user interface.

12. The construction site status monitoring system of claim 10, wherein the processing circuitry is further configured to:
cause a warning indication to be displayed on a user interface based on the construction site status report.

13. The construction site status monitoring system of claim 10, wherein the processing circuitry is further configured to:
cause a shutdown of the non-rented construction device based on the construction site status report.

14. The construction site status monitoring system of claim 10, wherein the processing circuitry is further configured to:
generate a site inventory for the construction site status report indicating each of the plurality of construction devices that are within a construction site perimeter based on the location data;
wherein the site inventory includes a first indicator for the rented construction device and a second indicator for the non-rented construction device;
wherein the first indicator for the rented construction device is adjacent to a remaining rental period indicator for the rented construction device, the remaining rental period indicator providing a duration of rental time remaining for the rented construction device.

15. The construction site status monitoring system of claim 10, wherein the construction site status report includes an indication of usage of the rented construction device and the non-rented construction device.

16. The construction site status monitoring system of claim 10, wherein the processing circuitry is further configured to:
cause a loss prevention alert based on the construction site status report.

17. The construction site status monitoring system of claim 10, wherein the processing circuitry is further configured to:
generate a rental invoice based on the rental rate data and the adjustment of the rental rate.

18. The construction site status monitoring system of claim 17, wherein the processing circuitry is further configured to:
receive construction device worker assignment data.

19. The construction site status monitoring device of claim 1, wherein the processing circuitry is further configured to:
determine a maintenance error for the rented or the non-rented construction device based on the runtime for the rented or non-rented construction device.

20. The construction site status monitoring device of claim 1, wherein the processing circuitry is further configured to:
   determine a condition warning for the rented or the non-rented construction device based on a detection by on-board circuitry of the rented or the non-rented construction device that the rented or the non-rented construction device has been subjected to an excessive drop force.

* * * * *